US012111020B2

(12) United States Patent
Dufour et al.

(10) Patent No.: US 12,111,020 B2
(45) Date of Patent: Oct. 8, 2024

(54) CONNECTED BACKFEEDING INSTALLATION AND METHOD FOR OPERATING SUCH AN INSTALLATION

(71) Applicant: GRTGAZ, Bois Colombes (FR)

(72) Inventors: Daniel Dufour, Bois Colombes (FR); Pascale Guillo-Lohan, Bois Colombes (FR); Frédéric Vulovic, Bois Colombes (FR); Francis Bainier, Bois Colombes (FR)

( * ) Notice: Subject to any disclaimer, the term of this patent is extended or adjusted under 35 U.S.C. 154(b) by 843 days.

(21) Appl. No.: 17/261,102

(22) PCT Filed: Jul. 30, 2019

(86) PCT No.: PCT/IB2019/020026

§ 371 (c)(1),
(2) Date: Jan. 18, 2021

(87) PCT Pub. No.: WO2020/026035

PCT Pub. Date: Feb. 6, 2020

(65) Prior Publication Data

US 2021/0285605 A1 Sep. 16, 2021

(51) Int. Cl.
*F17D 3/01* (2006.01)
*F17D 1/04* (2006.01)
(Continued)

(52) U.S. Cl.
CPC ................. *F17D 3/01* (2013.01); *F17D 1/04* (2013.01); *F17D 1/07* (2013.01); *F17D 3/10* (2013.01)

(58) Field of Classification Search
CPC ..... F17D 3/01; F17D 3/10; F17D 1/04; F17D 1/07
(Continued)

(56) References Cited

U.S. PATENT DOCUMENTS 7,624,770 B2 12/2009 Boyd et al.
11,396,981 B2 * 7/2022 Dufour ..................... F17D 3/01
(Continued)

FOREIGN PATENT DOCUMENTS

DE 102009038128 * 2/2011 ............... F17D 1/02
FR 3001523 A1 8/2014
(Continued)

OTHER PUBLICATIONS

ISR; European Patent Office; NL; Oct. 24, 2019.
(Continued)

*Primary Examiner* — Minh Q Le
(74) *Attorney, Agent, or Firm* — Patshegen IP; Moshe Pinchas

(57) ABSTRACT

The invention relates to a backfeeding installation (30) which comprises:

- at least one compressor (21) for compressing gas from a network (15),
- an automaton (25) for controlling the operation of at least one compressor,
- a remote communication means (9) for receiving at least one instantaneous pressure value captured remotely on the network upstream of the backfeeding installation,
- a means (8) for predicting the evolution of the pressure in the network upstream of the backfeeding installation, depending, at least, on the pressure values received,
- a means (7) for determining a pressure threshold value for stopping or starting at least one compressor according to the prediction of the evolution of pressure, the automaton controlling the stopping or the operation of at least one compressor when the pressure at the inlet of each compressor is lower, or higher, respectively, than the pressure threshold value that was determined.

19 Claims, 7 Drawing Sheets

(51) Int. Cl.
*F17D 1/07* (2006.01)
*F17D 3/10* (2006.01)

(58) Field of Classification Search
USPC ........ 137/2, 259, 899.4, 565.17, 14; 141/11, 141/98; 62/50.6
See application file for complete search history.

(56) References Cited

U.S. PATENT DOCUMENTS

| | | | | |
|---|---|---|---|---|
| 11,719,389 B2 * | 8/2023 | Dufour | F17D 1/04 | 137/2 |
| 2006/0254287 A1 * | 11/2006 | Greenberg | F17D 1/04 | 62/50.6 |
| 2007/0163256 A1 * | 7/2007 | McDonald | F17D 1/04 | 60/597 |
| 2012/0103426 A1 * | 5/2012 | Galeotti | F04D 27/0207 | 137/2 |
| 2012/0103429 A1 * | 5/2012 | Ersoy | F17D 1/07 | 137/484.2 |
| 2015/0240996 A1 | 8/2015 | Kapoor | | |
| 2018/0299075 A1 * | 10/2018 | Esmaili | G05B 13/0265 | |
| 2018/0299077 A1 * | 10/2018 | Isom | F17D 1/04 | |

FOREIGN PATENT DOCUMENTS

| | | |
|---|---|---|
| FR | 3007417 A1 | 12/2014 |
| FR | 3035598 A1 | 11/2016 |

OTHER PUBLICATIONS

"IFI Capacity Enhancement Project MP To IP Network Compression"; Winnard; Oct. 17, 2012.
"The Power Pioneers Bio-Natural Gas Plant Emmertsbuhl Feeding Biogas Into the Natural Gas Grid Emmertsbuhl" Darocha et al.; Apr. 27, 2012.

* cited by examiner

CONNECTED BACKFEEDING INSTALLATION AND METHOD FOR OPERATING SUCH AN INSTALLATION

TECHNICAL FIELD

The present invention concerns a connected backfeeding installation and a method for operating such an installation. It applies, in particular, to gas transport networks for exporting oversupplies of renewable natural gas from a distribution network to a transport network having a greater reception capacity, supplying a much larger consumption area, or storage capacity, thanks to the storage installations that are connected to it.

STATE OF THE ART

Biogas production is growing rapidly in Europe. The added value it brings underpins the creation of a sustainable anaerobic digestion industry. Hereinafter, the term “biomethane” means the gas produced from the raw biogas obtained from the anaerobic digestion of organic waste (biomass) or by high-temperature gasification (followed by methanation synthesis), which is then cleaned and treated so that it becomes interchangeable with the natural gas of the network.

While the most common method of adding value is the generation of heat and/or electricity, its utilization as a fuel and the injection of biomethane into the natural gas network are also being developed.

The injection of biomethane into the natural gas network is already taking place in Europe. Against a background of the rapid development of biomethane, the natural gas distributors are faced with situations in which there is a shortage of outlets. This is because consumption by domestic customers over the public distribution systems varies on average from 1 to 10 between winter and summer. The injection of biomethane is initially possible only if it is done at a flow rate less than the minimum flow rate recorded during the periods of lowest consumption, or if the biomethane is produced as close as possible to where it is consumed. When production exceeds the quantities consumed, this tends to saturate the distribution networks during warm seasons. This situation limits the development of the biomethane production industry through the congestion of the natural gas distribution networks. Several solutions have been identified to solve this problem: the interconnection of distribution networks to increase the consumption capacities for the biomethane produced by increasing the number of consumers connected; adjusting biomethane production according to the seasons and consumption needs; micro-liquefaction and compression for storing biomethane production during periods of low consumption; the development of uses for the gas (in particular, for mobility); and the production of backfeeding units between the natural gas distribution and transport networks.

Backfeeding installations are therefore one of the solutions identified for developing biomethane injection capacities. These installations make it possible to export oversupplies of biomethane from a distribution network to the transport network, by compressing and reinjecting them into this transport network to benefit from its much larger gas storage capacity. Consequently, the producers would no longer have to limit their production and the profitability of their projects would be guaranteed more easily. The backfeeding unit is a structure of the transport operator that allows gas to be transferred from the distribution network to the transport network having a larger storage capacity, via a gas compression station. The backfeeding unit can be located either in the vicinity of the pressure reducing station or at another location where the transport and distribution networks cross.

Backfeeding therefore includes a function of compressing the gas to adapt it to the constraints imposed at the downstream of this compressor, i.e. the transport network. Current backfeeding units are stationary installations in which the compressors are placed inside buildings. There, each compressor is driven by an electric motor connected to the electricity grid.

However, the pressure and flow rate of the gas in the distribution network are very variable, especially in relation to the injection of biogas by a producer or the consumption of gas by consumers, for example industrial sites. The simple pressure regulation of gas in the distribution network can therefore lead to activation of the backfeeding installation for exporting gas to the transport network and then, a few moments later, the expansion of the gas from the transport network to supply it to the distribution network. Therefore, the operation of the backfeeding installation can only be partially efficient.

In addition, distribution network configurations evolve, especially when a biogas supplier connects to it and injects biogas into it, or disconnects from it. At the same time, gas consumption in this distribution network can increase or decrease, for example when a consuming factory or large store is installed or when it stops. Once again, the operation of the backfeeding installation may be partially inefficient.

Currently, the equipment of the backfeeding units is controlled automatically based on orders transmitted remotely by an operator and/or by information collected directly on the backfeeding installation site. Consequently, the systems utilized do not enable an optimum management of the installation taking into account elements collected outside the backfeeding site. In addition, supervision of the backfeeding installation and the configuration of the analyzers is only possible on site, at the backfeeding installation. A sizable presence of operations teams is therefore necessary on the spot.

DESCRIPTION OF THE INVENTION

The present invention aims to remedy all or part of these drawbacks.

To this end, according to a first aspect, the present invention relates to a backfeeding installation comprising:

- at least one compressor for compressing gas from a network;
- an automaton for controlling the operation of at least one compressor;
- a remote communication means for receiving at least one instantaneous pressure value captured remotely on the network upstream of the backfeeding installation;
- a means for predicting the change in pressure in the network upstream of the backfeeding installation, as a function, at least, of the pressure values received;
- a means for determining a pressure threshold value for stopping or starting at least one compressor as a function of the predicted pressure change, the automaton controlling the stopping or operation of at least one compressor when the pressure at the inlet of each compressor is respectively lower, or higher, than the pressure threshold value that was determined.

In some embodiments, the prediction means utilizes a dynamic learning process and profiles of consumers, suppliers and capacities, and response times for the backfeeding installation.

In some embodiments, the prediction means utilizes artificial intelligence algorithms and/or neural networks.

In some embodiments, the prediction means uses historic data, in particular, for a large number of dates and times, of pressures observed at different points in the distribution network and of the starting and stopping of safety, expansion, backfeeding, consumption, injection functions.

In some embodiments, the prediction means uses meteorological data.

In some embodiments, the prediction means uses the following for each gas consumer and each gas supplier present in the distribution network:

- the gas consumption or injection profile;
- the distance up to the backfeeding installation;
- the volume of gas or the average cross-section area of the line, up to the backfeeding installation.

In some embodiments, the prediction means uses the topology of the distribution network, with its branch lines and the positions of the sensors.

In some embodiments, the prediction means uses ramp-up curves for the expansion station and backfeeding installation.

In some embodiments, the prediction means is configured to determine preferential times for maintenance or inspection stops, minimizing a cost function of these stops.

In some embodiments, the prediction means is configured to predict pressures, in a timeframe of a couple of minutes or several hours.

In some embodiments, the prediction means is configured to predict maximum and minimum pressure setpoint values.

In some embodiments, the backfeeding installation also comprises a means for determining a loading rate of each compressor as a function of the predicted pressure change, the automaton controlling the operation of each compressor to achieve the loading rate that was determined.

In some embodiments, the backfeeding installation also comprises

- a means for analyzing the quality of the gas to be compressed;
- a remote communication means for receiving at least one instantaneous gas quality value captured remotely upstream or downstream of the backfeeding installation;
- a means for predicting the change in gas quality in the network upstream of the backfeeding installation, as a function, at least, of the quality values received;
- a means for determining a gas quality threshold value for stopping at least one compressor as a function of the predicted quality change,
- the automaton controlling the stopping of at least one compressor when the quality at the inlet of each compressor is lower than the quality threshold value that was determined.

In some embodiments, the backfeeding installation also comprises a means for determining a loading rate of each compressor as a function of the predicted quality change, the automaton controlling the operation of each compressor to achieve the loading rate that was determined.

According to a second aspect, the present invention relates to a method for operating a backfeeding installation comprising:

- at least one compressor for compressing gas from a network; and
- an automaton for controlling the operation of at least one compressor;

said method comprising the following steps:

- a step of receiving, from a remote sensor, at least one instantaneous pressure value captured remotely from the backfeeding installation;
- a step of predicting the change in pressure in the network upstream of the backfeeding installation;
- a step of determining a pressure threshold value for stopping or starting at least one compressor as a function of the predicted pressure change;
- a step of respectively stopping or starting the operation of at least one compressor when the pressure at the inlet of each compressor is respectively lower, or higher, than the pressure threshold value that was determined.

In some embodiments, the method also comprises:

- a step of determining loading rates for the compression unit to be applied as a function of the predicted pressure change;
- a step of regulating the operation of each compressor to achieve the loading rate to be applied.

In some embodiments, the method also comprises:

- a step of receiving, from a remote sensor, at least one instantaneous gas quality value captured remotely from the backfeeding installation;
- a step of predicting the change in gas quality upstream of the backfeeding installation;
- a step of determining a gas quality threshold value for stopping each compressor as a function of the predicted quality change;
- a step of stopping the operation of each compressor when the gas quality at the inlet of each compressor is lower than the quality threshold value that was determined.

In some embodiments, the method also comprises:

- a step of determining loading rates for the compression unit to be applied as a function of the predicted gas quality change; and
- a step of regulating the operation of each compressor to achieve the loading rate to be applied.

As the particular features, advantages and aims of this method are identical to those of the installation that is the subject of the invention, they are not repeated here.

BRIEF DESCRIPTION OF THE FIGURES

Other advantages, aims and characteristics of the present invention will become apparent from the description that will follow, made, as an example that is in no way limiting, with reference to the drawings included in an appendix, wherein.

DESCRIPTION OF EMBODIMENTS OF THE INVENTION

Figure 1:
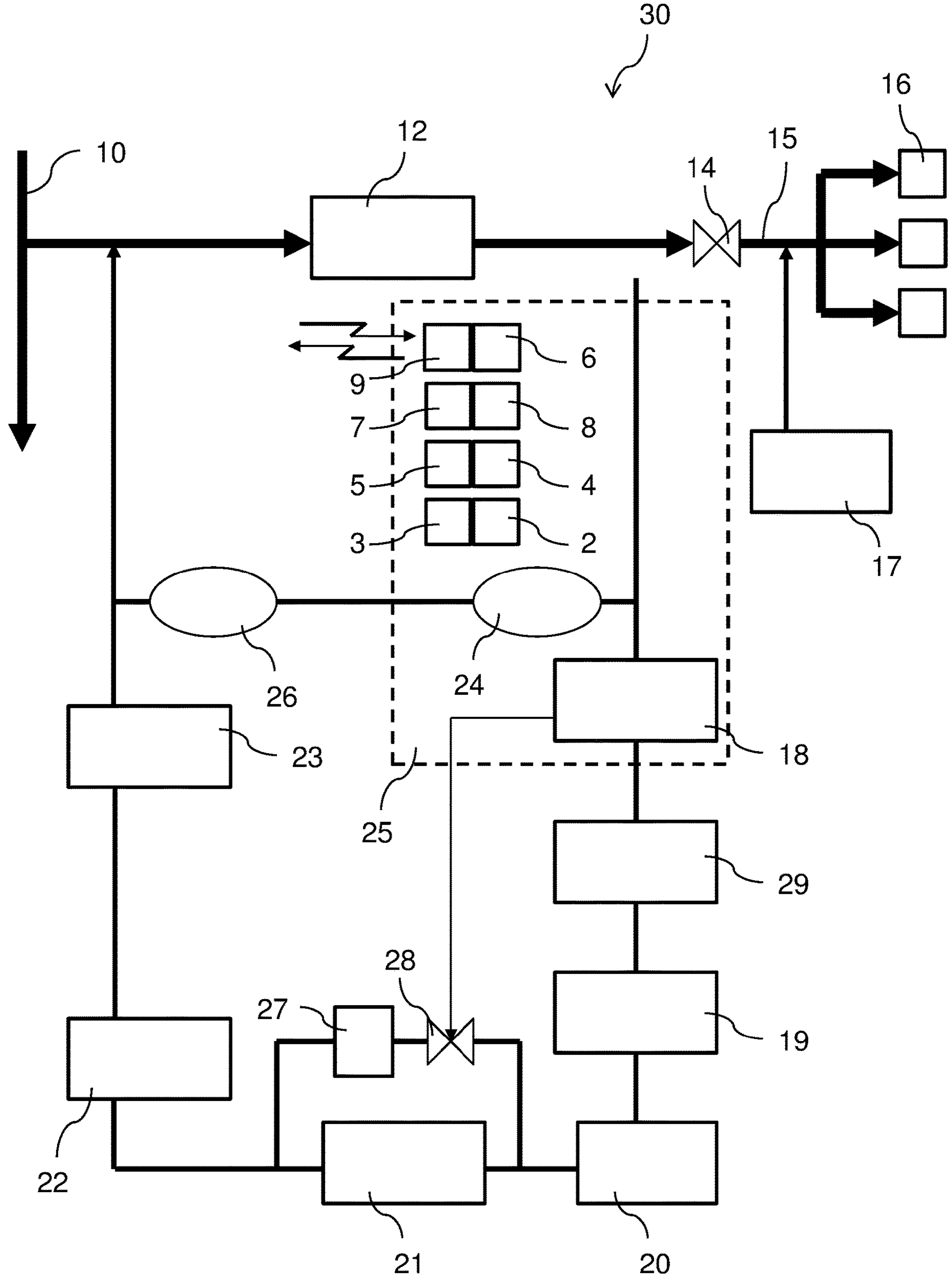
FIG. 1 represents, in the form of a block diagram, a backfeeding installation that is the subject of the invention.

FIG. 1 represents, schematically, a backfeeding installation that is the subject of the invention. The backfeeding installation has a set of technical functions making it possible to create a flow of gas by controlling the operating conditions specific to a transport network 10 and a distribution network 15. These functions comprise:

- the analysis and verification 19 of the compliance of the quality of the gas to be compressed with the technical specifications of the transport operator;
- the metering 20 of the quantities transferred;
- the compression of the gas from the distribution network 15 by at least one compressor 21, generally compressors with an electric motor and, with two or three compression stages;
- the pressure or flow rate regulation 24;
- the filtering 22, upstream and downstream;
- the management 18 of the operational stability of the distribution network;
- the safety devices 26; and
- the tools 24 for managing and monitoring the backfeeding installation.

These various functions are described below. In addition there are the utilities (electrical sources, communication network, etc.) necessary to operate an industrial facility. The backfeeding installation is sized taking into account:

- the operating pressure of the transport network 10 and of the distribution network 15. The first must be between 30 and 60 bar over the regional network, and can reach 85 bar over the main network. The second is 4 to 19 bar over the MPC networks (Medium Pressure Network type C, i.e. pressure between 4 and 25 bar) and less than 4 bar over the MPB networks (Medium Pressure Network type B, i.e. pressure between 50 millibar and 4 bar);
- the maximum production capacity of the biomethane producers 17 likely to inject biomethane into the distribution network 15, a capacity that varies by several tens of $Nm^3/h$ for the smallest units, to several hundreds of $Nm^3/h$ for the largest;
- the consumption of consumers 16 over the distribution network 15, especially the minimum consumption; and
- the ability of the distribution network 15 to absorb variations in pressure (water volume).

All of these data make it possible to determine the maximum flow rate of the backfeeding installation and estimate its operating time. This can vary, depending on the case, from an occasional operation (10-15% of the time) to an almost continuous operation. This operation must also include the fact that the installations of the producers 17 are put into service over the years, not simultaneously.

With regard to the gas compliance analysis 19, differences exist between the gas quality specifications applied to the transport 10 and distribution 15 networks, because of the different operating pressures, infrastructure, materials, uses and interfaces with the underground storage units. The specifications of the transport networks 10 are generally more stringent than those of the distribution networks 10. Therefore, to ensure that the gas backfeeding installation from the distribution network 15 to the transport network 10 is consistent with in-production operations in the transport network 10, the following provisions are provided:

- a dehydration unit 29 upstream of the compression unit 21, to reduce the condensation risks on the high-pressure transport network, the formation of hydrates and corrosion;
- optionally, a laboratory for analyzing combustion parameters (Wobbe index, heating value and density of the gas), for injecting the samples into the energy determination system of the transport operator.

At the transport operator's discretion, the analysis of levels of other compounds ($CO_2$, $H_2O$, THT, etc.) is optional, and is only carried out if there is a proven risk of contamination of the transport network 10 (for example, backfeeding biomethane with a high $CO_2$ content with no possibility of dilution over the distribution 15 and transport 10 networks, or operation at a very high pressure).

With regard to gas metering 20, the backfeeding installation is equipped with a measurement chain made up of a meter and a local or regional device for determining the energy per the legal metrology.

With regard to gas compression, the compression unit enables the surplus biomethane production to be compressed to the operating pressure of the transport network 10. There are several possible configurations, depending on the economic criteria and availabilities of the installation such as, for example:

- one compressor 21 providing 100% of the maximum backfeeding need;
- two compressors 21, each providing 100% of the maximum backfeeding need; or
- two compressors 21, each providing 50% of the maximum backfeeding need.

The configuration is chosen by examining the various advantages and drawbacks in terms of costs, availability, dimensions, and scalability of the compression unit. The suction pressure to be considered is the operating pressure of the distribution network 15, which depends in particular on the injection pressures of the biomethane producers 17. The discharge construction pressure to be considered is the maximum operating pressure ("MOP") of the transport network, for example 67.7 bar. A recycling circuit 27 equipped with a valve 28 can be included to ensure the starting, anti-surge protection of each compressor 21 (other than piston compressors) or stabilized operation in recycling mode. The recycling circuit expands the gas to the second pressure and injects it upstream of the compressor when at least one compressor is put into operation, under the control of an automaton 25.

The impermeability of each compressor 21 can be achieved with oil or a dry seal. In the first case, certain filtering provisions are implemented (see below).

The automaton 25 performs the functions of management 24, controlling the operation, loading rate and stopping of each compressor 21, and regulation and stability 18 of the network 15. Note that, throughout the description, the term "automaton" means a PLC or computer system, or a set of PLCs and/or computer systems (for example one PLC per function).

With regard to regulation, the change in the pressure of the distribution network 15 in the vicinity of the backfeeding installation is correlated to the flow rate of the gas passing through the backfeeding installation. These changes are the result of the dynamic nature of gas consumption over the distribution network 15, capacities of biomethane injected by the producers 17 and the operation of the delivery installation, by means of a valve 14, and backfeeding installation. This therefore incorporates possibilities to adapt the operating range for the suction pressure of the backfeeding installation, and also a regulation of the compressors 21 that can anticipate the constraints operating over the distribution network 15, depending on the configurations encountered. This differs from delivery stations without backfeed, for which the pressure is regulated at the delivery point so as to be fixed, regardless of the consumption by the consumers 16. Consequently, the regulation mode (pressure or flow rate) of the backfeed flow towards the transport network 10 is adapted to the correct operation of the backfeeding installation.

Depending on the specifications of the compressors, and to prevent their deterioration or because of the constraints linked to the operation of the transport network 10, filtering is envisaged in the gas quality compliance function, upstream of the compression unit, to collect any liquid and the dust contained in the gas from the distribution network 15. In addition, in the case of an oil-sealed compressor 21, a coalescing filter 22 is installed at the outlet from the compressor 21, for example with manual venting and a gauge glass.

A cooling system 23 cools all or part of the compressed gas to maintain the temperature downstream, towards the transport network 10, at a value below 55° C. (certification temperature of the equipment). To ensure the operation of the cooling system 23, it is sized using relevant ambient temperature values based on meteorological records.

The delivery station 12 is an installation, located at the downstream end of the transport network, which enables the natural gas to be delivered according to the needs expressed by the customer (pressure, flow rate, temperature, etc.). Therefore, this concerns the expansion interface for the gas from the transport network 10 to the distribution network 15 or to certain industrial installations. The delivery station 12 therefore incorporates expansion valves to reduce the pressure in order to adapt to the conditions imposed downstream.

To prevent instability phenomena, the backfeeding installation must not operate simultaneously with the expansion and delivery station 12 from the transport network 10 to the distribution network 15. Threshold values for starting and stopping the backfeeding installation are set accordingly, and each automaton 25 of an installation combining expansion 12 and backfeed is adapted to prohibit the simultaneous occurrence of these two functions. The backfeeding installations, during their starting, operation and stopping phases, limit the disruptions in the upstream network (distribution 15) and downstream network (transport 10) by, in particular, preventing the pressure safety measures of the delivery station 12 from being triggered. The following parameters are taken into account:

- number of starting and stopping cycles of each compressor 21 and its compatibility with the recommendations of the supplier of the compressor 21;
- the starting and stopping of each compressor 21 by a routine, following a time delay;
- the use of a buffer volume (not shown) upstream of each compressor 21, to level out pressure and flow rate variations of the distribution network 15.

A management and monitoring function performed by the automaton 25 makes it possible to obtain:

- an automatic operation mode;
- display/monitoring of the operation of the backfeeding installation; and
- the starting of the backfeeding installation.

Data historization is carried out to confirm the operating conditions.

In an emergency, the backfeeding installation is isolated from the distribution network 15 by closing the valve 14. An "emergency stop" function allows the backfeeding installation to be stopped and made safe. The backfeeding installation is also equipped with pressure and temperature safety devices 26. There is no automatic venting unless contraindicated in the safety studies. The backfeeding installation is equipped with gas and fire detection systems 26. A means for protection against excess flows is provided to protect the devices, in the form of a physical component such as a restrictor hole or by means of an automaton.

Note that the flow rate of a backfeeding unit can vary from several hundred to several thousand $Nm^3/h$, depending on the case.

The automaton 25 is equipped with:

- a remote communication means 9, configured to receive at least one instantaneous pressure value and at least one instantaneous gas quality value captured remotely on the network upstream of the backfeeding installation;
- a means 8 for storing historic and prediction data;
- a means 7 for determining a pressure threshold value for stopping or starting at least one compressor 21 as a function of the predicted pressure change;
- a means 6 for determining a loading rate to be applied to each compressor 21 as a function of the predicted pressure change, the automaton 25 controlling the operation of each compressor 21 to achieve the loading rate that was determined;
- a means 5 for predicting changes in the gas quality in the network upstream of the backfeeding installation, as a function, at least, of the quality values received;
- a means 4 for determining a gas quality threshold value for stopping at least one compressor 21 as a function of the predicted quality change, the automaton 25 controlling the stopping of at least one compressor when the quality at the inlet of each compressor is lower than the quality threshold value that was determined;
- a means 3 for determining a loading rate to be applied to each compressor 21 as a function of the predicted quality change, the automaton 25 controlling the operation of each compressor to achieve the loading rate that was determined;
- a means 2 for automatically selecting flow rate or pressure regulation mode (for example, between two threshold values (SH and SB), the regulation mode is a flow rate regulation; outside the bounds of these two threshold values, the regulation mode is pressure regulation).

Figure 2:
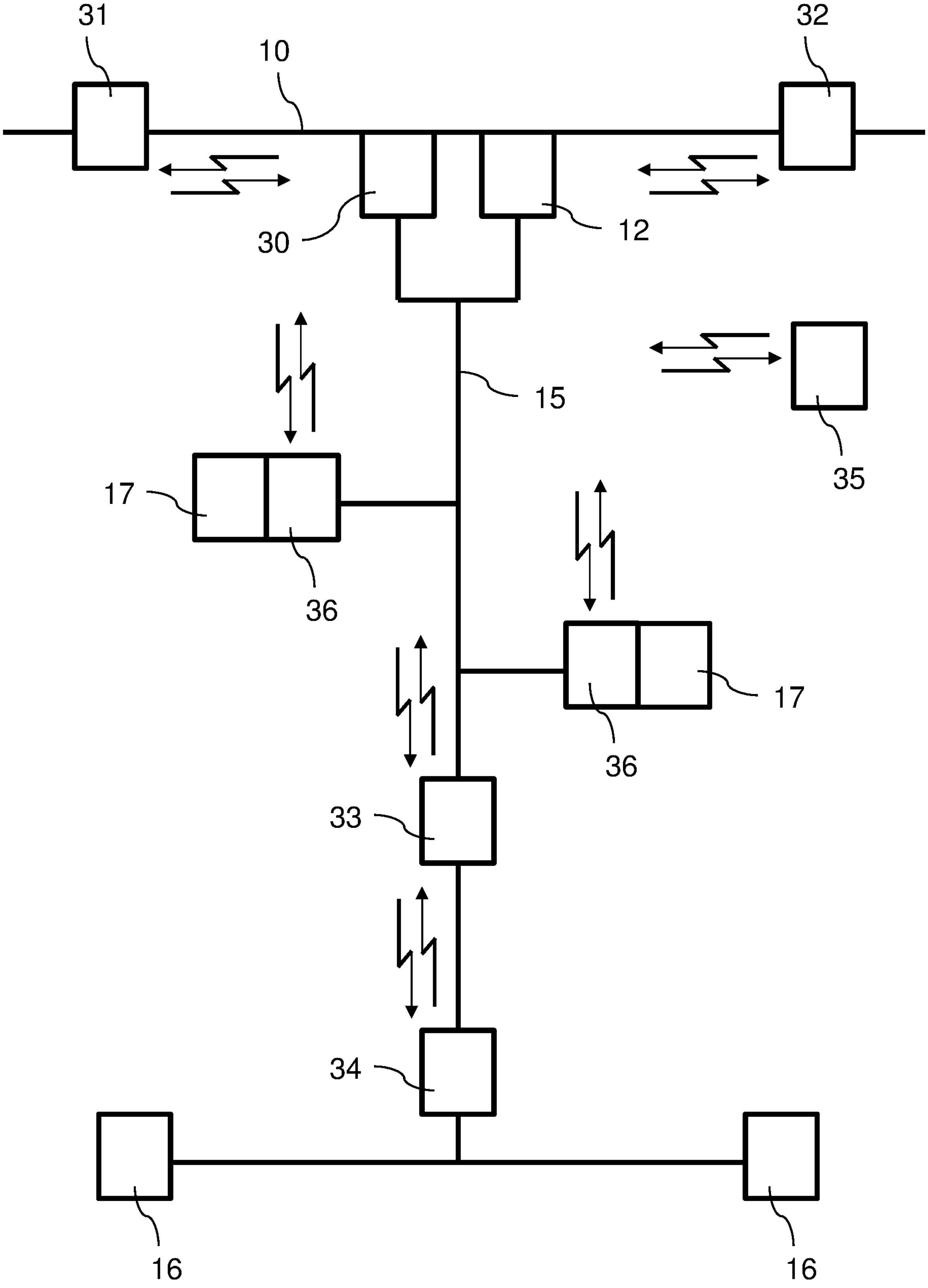
FIG. 2 represents, partially and in the form of a block diagram, a transport network and a distribution network equipped with means for communicating with the backfeeding installation that is the subject of the invention.

FIG. 2 represents the gas transport network 10, the distribution network 15, the consumers 16, the biomethane producers 17, the expansion and delivery station 12, and the backfeeding installation 30.

The transport network 10 is equipped with a communicating pressure sensor 31 and a communicating flow rate sensor 32. The distribution network 15 is equipped with a communicating pressure sensor 33 and a communicating flow rate sensor 34. A communicating source of meteorological information 35 supplies geolocated meteorological data. Lastly, the biomethane producers 17 are connected to the distribution network 15 by injection points equipped with communicating flow rate sensors 36.

A computer network (not shown), for example internet over the mobile telephone network, connects all the communicating sensors.

The storage and prediction means 8 analyses the data received from the various sensors and from the source 35, in particular the pressure sensor 33 and flow rate sensor 34, and, as a function of the meteorological data and the days and times of the week (taking into account public holidays, and summer and winter time), predicts consumption over the distribution network 15.

In this way, the invention provides data collection and transmission for the backfeeding installation. It thus provides a data exchange with three separate functions:

- sharing data between the distribution network operator, upstream of the backfeeding installation and the transport network operator, downstream of the backfeeding unit;
- providing "gas movement" data to the operator (access to pressures and flow rates for the network), as a result of which an operator can orient certain interventions, such as determining the following lengths of time:
  - the length of time available for an intervention on all or part of the installation (for example, gas treatment or gas analysis) without adversely affecting the biomethane producers,
  - the length of time before having to make an on-site intervention before the biomethane producer is impacted, or the necessity of intervening or not;
- remote operation and remote maintenance of the backfeeding installation.

With regard to sharing data between the network operators, the operator of the transport network 10, as operator of the backfeeding installation, has data on the incoming gas quality, and pressure and flow rate data for the distribution network.

Exchanging gas quality data makes it possible to determine the characteristics of the gas such as the composition or the HHV (Higher Heating Value) at the location of the backfeeding installation, and not have to perform additional analyses on this backfeeding installation. Compared to existing backfeeding units, this innovation therefore makes it possible to dispense with some analyzers and in this way reduce the capital costs of the backfeeding unit, and also to temporarily operate without some analyzers. To achieve this, the biomethane stations injecting into the distribution network in question record the gas process and safety information in real time, and this information is then sent via an internet link to a server processing these data and making them available to the operator of the distribution network 15.

Various algorithms can be used to:

- directly verify values on the distribution network against the threshold values ("limits") authorized on the downstream network;
- calculate gas mixtures, carried out on the distribution network with the threshold values authorized on the downstream network, using
  - a mole percent calculation upstream of the backfeeding unit;
  - systems for tracking quality by simulating transit times in a stationary regime, or incorporating dynamic regimes;
  - interconnection construction systems (for example, Lagrange type) making it possible to reconstruct (calculate) missing data, in this case the data on input to the compression unit.

The parameters of the mathematical model are data describing the network (roughness, diameter, length, then possibly second-order data such as linearity, thermal exchange coefficients of the lines and the ground, burial depth, or any other values making it possible to refine the description of the structure in the model), the model being supplied by the temporal data for gas quality, flow rate and pressure available in the upstream network;

- the threshold values that can be accepted on the downstream network can be scalable as a function of the characteristics of the gas of the downstream network and of the quantities passing through it. For example, a gas circulating without hydrogen ($H_2$) over the network downstream of the compression unit can accept a gas upstream of the compression unit at the molar proportion of the mixture of both gases up to the acceptable limit on the network.

The real-time sharing of pressures and flow rates of the distribution network 15 connected to the backfeeding installation 30 is carried out by connected pressure sensors positioned at certain critical points of the distribution network 15, identified by static and dynamic analyses. This sharing of data makes it possible to optimize the management of the backfeeding installation (especially with regard to stopping/starting and the load) and to make the process secure by anticipating risks and impacts on the distribution network 15.

Figure 3:
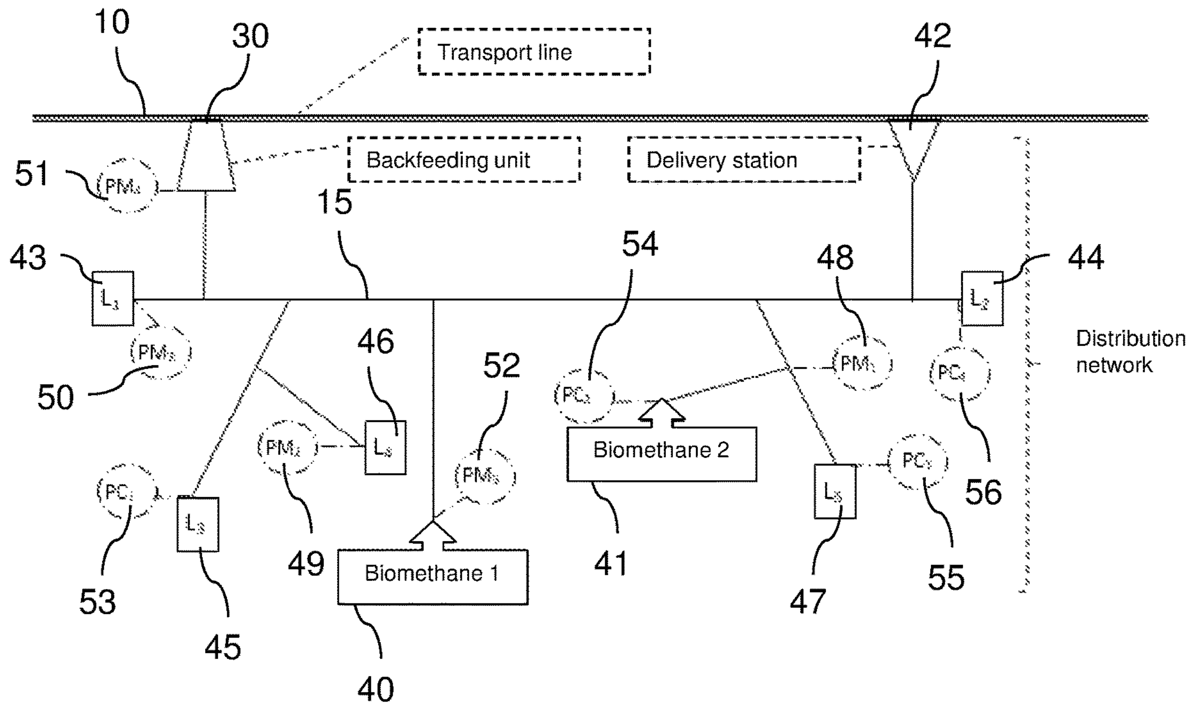
FIG. 3 represents, partially and in the form of a diagram, a transport and distribution network with positions of measurement equipment and calculation results.
Figure 4:
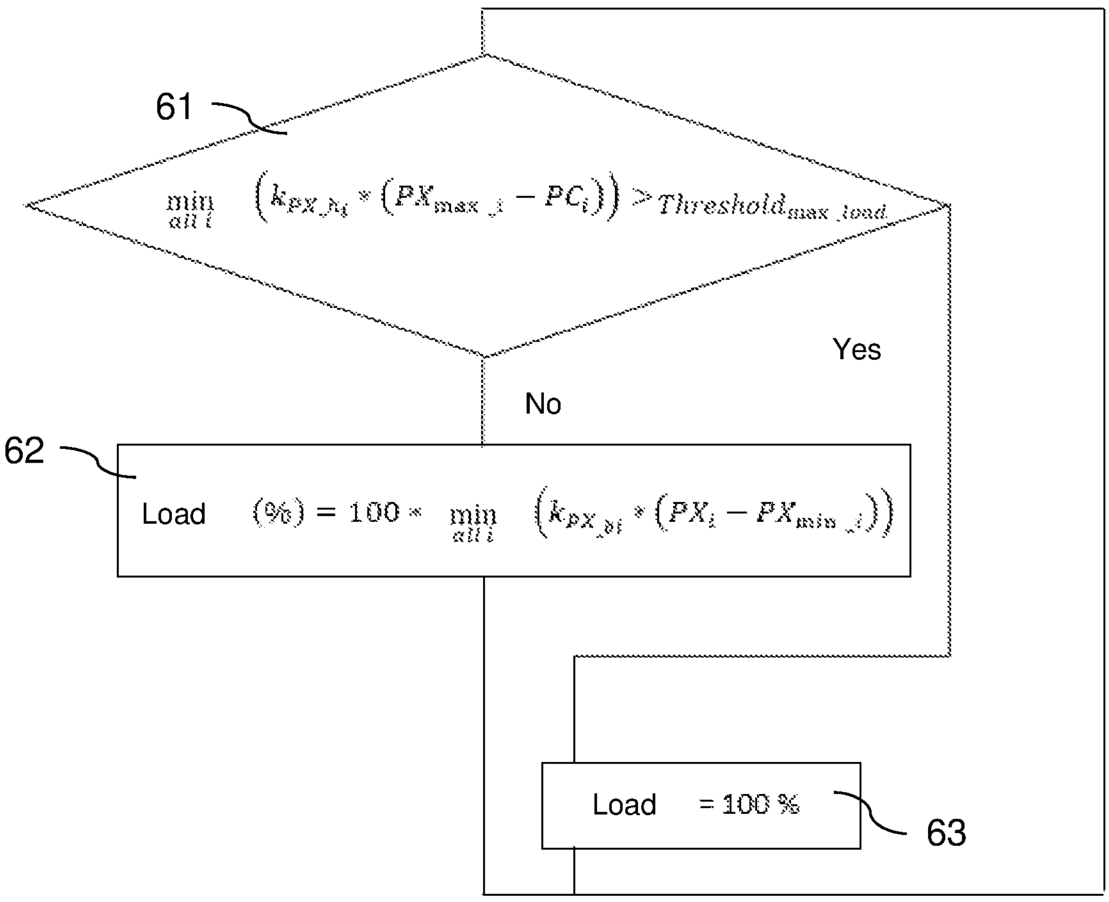
FIG. 4 represents an algorithm for determining the load calculation for a compression unit as a function of remote data.

FIGS. 3 and 4 describe transport and distribution networks and a management algorithm that can be utilized, making it possible to define the load level, the need to start a compressor (case where the loading rate is equal to 100%). Similarly, a lower threshold can be defined making it possible to define the stopping of a compressor. A transport network 10 and a distribution network 15 are interfaced by a backfeeding installation 30 and an expansion and distribution station 42. Note that the backfeeding installation 30 can be stationary, mobile (for example consisting of modules that can be transported by a truck) or scalable (the installation comprising locations and connectors for adding compressors).

FIG. 3 shows in particular a distribution network with:

- three points of delivery to the secondary network, referred to as the "distribution network", 15 (two biomethane units 40 and 41 and an expansion and delivery station 42 of the transport network, separate from the backfeeding installation 30);
- five points of delivery 43 to 47 of the secondary network (key: square indicated by the code "L" with a subscript);
- five pressure measurement sensors 48 to 52 (key: circle indicated by the code "PM" with a subscript);
- four pressure calculation units 53 to 56 (key: circle indicated by the code "PC" with a subscript).

Note that the pressure measurement sensors and the pressure calculation locations have been positioned in FIG. 3 without seeking compatibility with a calculation.

FIG. 4 is an example of a mathematical function allowing the loading rate of the compression unit to be defined. The k coefficients are determined by simulation or by measurements on the network that can require tests; they can also be obtained through artificial intelligence with a learning process. The k coefficients express the importance (in other words, the weight or criticality) of the measurement point relative to the management constraint. If the data from the prior measurement simulation or analysis indicate only one constraining measurement point for the management, then that point is called the critical point (this is the point used for the management). In the proposed algorithm, the k coefficient allows the critical point to be changed according to changes in pressure.

In FIG. 4:

PX=PM or PC $PX_{max\_i}$: max pressure that can be reached at this point; all $PX_{max\_i}$ are identical in the case of FIG. 3

$PX_{min\_i}$: min pressure that can be reached at this point.

During a step 61, it is determined whether, for every value of i, the minimum of $(k_{pX\_hi}*(PX_{max\_i}-PC_i))>Threshold_{max\_load}$.

If not, during a step 62, the formula load (%)=$100*min_{all\ i}(k_{pX\_bi}*(PX_i-P_{xmin\_i}))$ is applied. If the result of step 61 is yes, then during a step 63 the loading rate is set to 100%.

Therefore, the closer the load level is to 100% at its low regulation level, the more the knowledge of the load by the algorithm of FIG. 4 allows the compression (also called the "loading rate") to be accelerated or decelerated as a function of the distance between the closest upper and lower limits. The acceleration and deceleration rates can be calculated by PID (Proportional/Integral/Derivative).

The operational optimization component aims to provide the operations teams of the transport network 10 with pressure and flow rate data for the network, whether real-time or for a period of several months. This means that the operator can view the pressure and flow rate data for the network in the form of a block diagram. It can therefore analyze a situation more rapidly and better understand its intervention in full knowledge of all the parameters of the network, which is not the case currently. This also allows alarms to be reported when the backfeeding installation 30 is in operation and the injection unit 12 is discharging at the same time. This reporting of information to the operator is based on the technology used for the "@home" applications of the National Dispatching Center and Regional Monitoring Centers (Centres de Surveillance Régionaux: CSR), retrieving the remote management system information and presenting it in a form that can be used directly by the intervention teams.

The data provided to the operations teams are the source data from the acquisition, and all the data (intermediate and final) calculated by the algorithms proposed for utilizing the invention, with these calculated data being time-stamped. These data enable the intervention teams to make their own analyses, for example simple prorated calculations or by comparison with similar situations already encountered. Thanks to their time-stamping, these collected data enable the operations teams to evaluate the length of time until an intervention is necessary, evaluate the consequences of a reduction in the loading rate on a possible postponement of the intervention, or a possibility of not intervening.

The computer network for the backfeeding installation also includes remote diagnosis and remote maintenance functions for the in-house operations teams of the operator of the transport network 10 and contractors in charge of part of the maintenance. The innovation lies in the possibility of remotely viewing the human-machine interface/supervision displays for the backfeeding installation and being able to configure the analyzers remotely, not just on site. These solutions make maintenance operations easier and reduce the intervention time for the teams (travel reduced, coordinated schedules of the various parties involved, etc.) and the downtime of the backfeeding installation, compared to the existing backfeeding installations.

The automaton 25 sets:

- a first pressure threshold value used for starting the operation of each compressor 21 of the backfeeding installation 30 and, possibly, for the recycling circuit 27 and the valve 28;
- a second pressure threshold value used for stopping the operation of each compressor 21 of the backfeeding installation 30;
- a third pressure threshold value used for starting the operation of the expansion and delivery station 12; and
- a fourth pressure threshold value used for stopping the expansion and delivery station 12;

as a function of:

- the consumption prediction supplied by the prediction means 8;
- the data received from the various sensors, in particular the pressure sensor 33 and flow rate sensors 34 and 36.

Then, when the pressure of the distribution network 15 exceeds the first threshold value set in this way, the automaton 25 starts the operation of at least one compressor 21 and, possibly, of the valve 28. Conversely, when the pressure of the distribution network 15 falls below the second threshold value set in this way, the automaton 25 stops the operation of each compressor 21.

Figure 5:
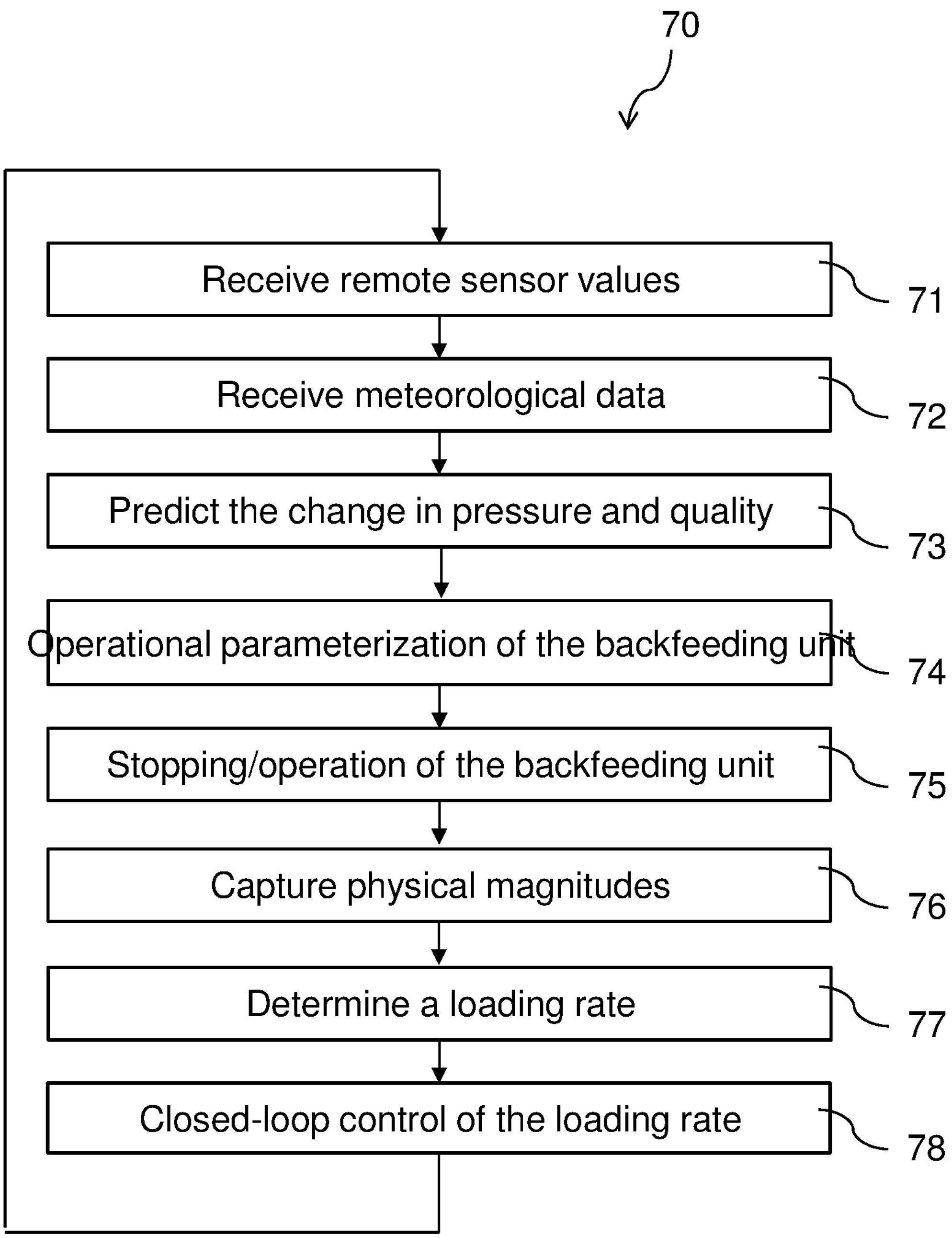
FIG. 5 represents, in the form of a logic diagram, steps in the operation of a backfeeding installation that is the subject of the invention.

FIG. 5 details steps in a method 70 for operating the automaton 25 controlling the backfeeding installation 30. In FIG. 5 it is assumed that each compressor 21 of the installation 30 is stopped and that the expansion and delivery station 12 is also stopped.

During a step 71, the automaton 25 receives and stores instantaneous pressure and flow rate values from the various sensors, in particular the remote pressure 33 and flow rate 34 sensors. The automaton 25 also receives and stores, preferably, instantaneous gas quality values captured remotely from the backfeeding installation 30.

During a step 72, the automaton 25 receives and stores meteorological data, in particular the air temperature and wind.

During a step 73, the automaton 25 predicts consumption over the distribution network 15, as a function of data stored in memory, the day of the week and time, and meteorological data received. The day of the week, time, air temperature and wind make it possible, in particular, for the automaton 25 to predict the consumption of consumers 16, by statistical and predictive processing of data stored in memory, for example over a 1-hour period. By subtracting from it the average flow rate by the producers 17, captured at the location of the injection points by the sensors 36, and as a function of the average injection duration for each of the producers, a change in the pressure in the distribution network 15 is predicted.

During the step 73, the prediction of a change in the pressure in the network is performed upstream of the backfeeding installation, and the prediction of a change in the gas quality is performed upstream of the backfeeding installation.

During a step 74, as a function of the pressure prediction, the automaton determines:

- a first pressure threshold value used for stopping the operation of each compressor 21 of the backfeeding installation 30 and, possibly, for the recycling circuit 27 and the valve 28;
- a second pressure threshold value used for stopping the operation of each compressor 21 of the backfeeding installation 30;

- a third pressure threshold value used for stopping the expansion and delivery station 12;
- a fourth pressure threshold value used for stopping the expansion and delivery station 12; and
- a gas quality threshold value for stopping each compressor as a function of the predicted quality change.

Figure 8:
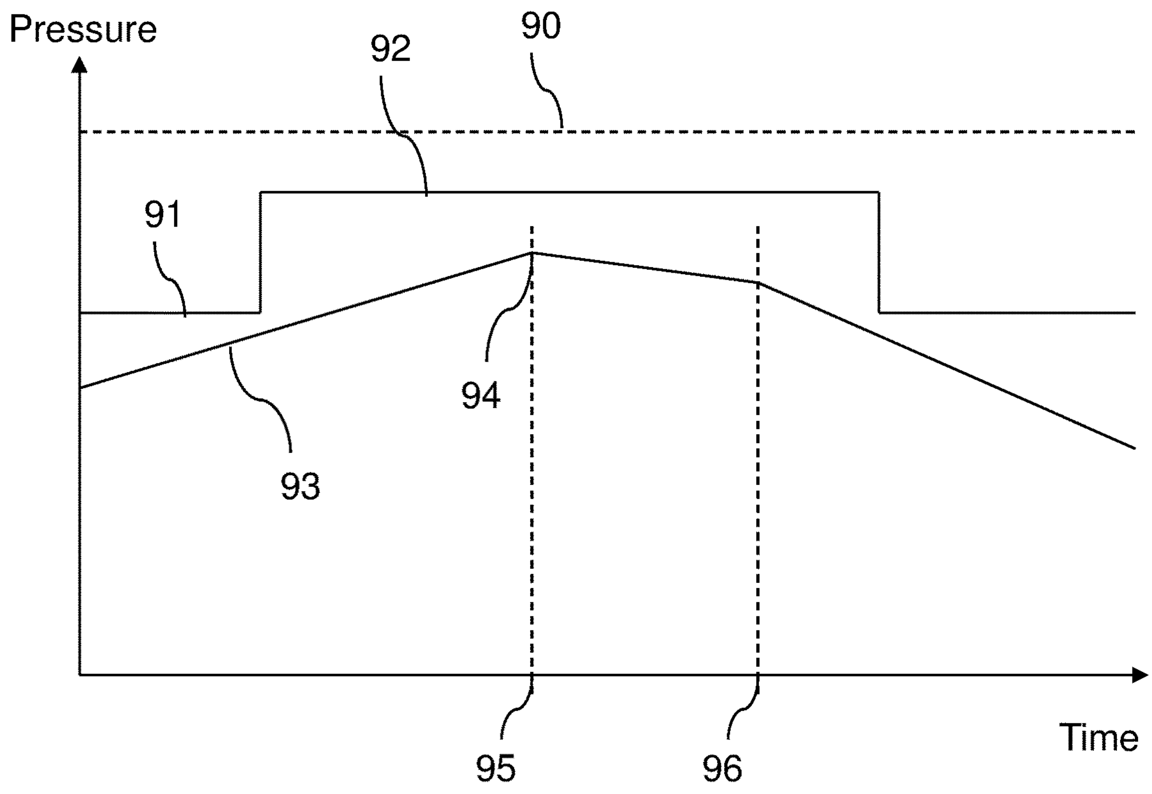
FIG. 8 illustrates, in the form of curves, changes in the pressure prediction and threshold value for triggering at least one compressor.

In particular, as shown in FIG. 8, if the prediction 93 shows, in the absence of delivery or compression, the coming occurrence of a temporary maximum pressure 94 at a level below the pressure 90 momentarily permitted by the distribution network 15, the first threshold value 91 is increased to a value 92 higher than or equal to this maximum 93. This case occurs, for example, when, at times 95 and 96, producers inject biomethane into the distribution network a few moments before the probable start of gas consuming professional, industrial or commercial installations. This eliminates having the compressor 21 start to compress gas followed, a few moments later, by stopping this compressor 21 and stopping the expansion and delivery station 12.

Figure 9:
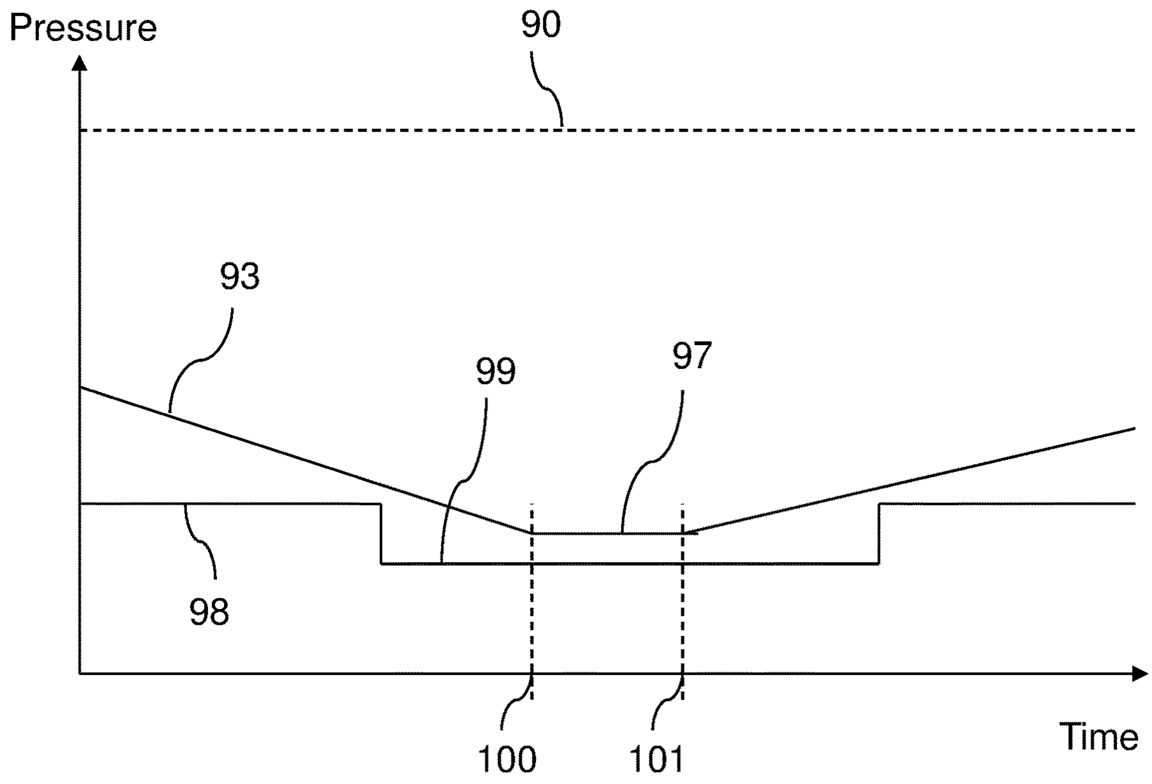
FIG. 9 illustrates, in the form of curves, changes in the pressure prediction and threshold value for triggering an expansion and delivery station.

In contrast as shown in FIG. 9, if the prediction 93 shows, in the absence of delivery or compression, the coming occurrence of a temporary minimum pressure 97, the third threshold value 98 is set at a value 99 lower than or equal to this minimum 97. This case occurs, for example, a few moments before the probable stopping 101 of gas consuming professional, industrial or commercial backfeeding installations whereas, at time 100, biomethane producers begin a biomethane injection whose duration is known, by declaration or learning, to continue beyond the predicted reduction in consumption. This eliminates the starting of the expansion and delivery station 12, followed, a few moments later, by stopping the expansion and delivery station and stopping the compression of gas by the compressor 21.

The second and fourth threshold values are set at intermediate levels between the first and third threshold values such that:

- the compression never occurs at the same time as the expansion and delivery (the second threshold value is always higher than the fourth threshold value); and
- the predictable change in pressure (the compensation for the pressure change taking into account the compression and delivery) remains close to the nominal operating pressure of the distribution network 15.

In this way, the four threshold values are optimized to limit the number of starting and stopping cycles of each compressor 21 and the number of starting and stopping cycles of the expansion and delivery station 12.

During a step 75, the automaton 25 determines whether the pressure of gas in the distribution networks 15 exceeds the first or fourth threshold values or falls below the second or third threshold value. If yes, the automaton 25 respectively initiates the stopping of at least one compressor 21, the stopping of the expansion and delivery station 12, the stopping of each compressor 21 or the operation of the expansion and delivery station 12.

During a step 75, the automaton 25 controls the stopping of the operation of each compressor 21 when the gas quality at the inlet of each compressor 21 is lower than the quality threshold value that was determined.

During a step 76, the capture of pressure and flow rate physical magnitudes is continued. During steps 77 and 78, when at least one compressor 21 is put into operation, the automaton 25 controls the operation of the recycling circuit 27 and the valve 28 to level out the pressure oscillations upstream and downstream of each compressor 21. Then, one goes back to step 71.

During a step 77, the automaton 25 determines loading rates for the compression unit to be applied as a function of the predicted pressure change. During a step 78, the automaton 25 regulates the operation of each compressor 21 to achieve the loading rate that was determined in this way. Possibly, the automaton 25 also determines, during the step 77, loading rates for the compression unit to be applied as a function of the predicted gas quality change. In that case, during the step 78, the automaton 25 regulates the operation of each compressor 21 to achieve the loading rate that was determined in this way.

With regard to the step 73, the predictions are performed by standard statistical calculations. These can, of course, be replaced by artificial intelligence to increase their performance. The statistically compiled data that can be used are, non-exhaustively, the pressures of the upstream network, the gas input flow rates, the calendar data such as the weekends, public holidays and vacation periods, the meteorological data (for example, temperatures measured, perceived, hydrometry, wind), the flow rates of the consumers and the flow rate of the backfeeding units. The item of output data is the pressure at the inlet of each compressor. The standard variations obtained make it possible to select the best correlations and to assign margins of error to the correlation selected. The results of the correlations are used as follows:

- a simulation calculation making it possible to have the maximum authorized suction pressure;
- a simulation calculation making it possible to have the minimum suction pressure;
- the integral of the deviation between the correlated pressure and the minimum pressure multiplied by the volume in water of the upstream network makes it possible to define the flow rate that can be absorbed by the backfeeding compression unit in the time period considered;
- the integral of the deviation between the correlated pressure and the maximum pressure multiplied by the volume in water makes it possible to define the flow rate that can be reduced in the backfeeding compression unit in the time period considered;
- by comparing the two values above to the capacities of the compressor (minimum and maximum flow rate), the flow rate to be compressed is calculated. This must respond:
  - if detected, to the need to start another compressor, increase the flow rate of the compressors in operation, until this needs disappears;
  - if detected, to the need to stop a compressor, minimize the flow rate of the compressors in operation, until this needs disappears.

Figure 6:
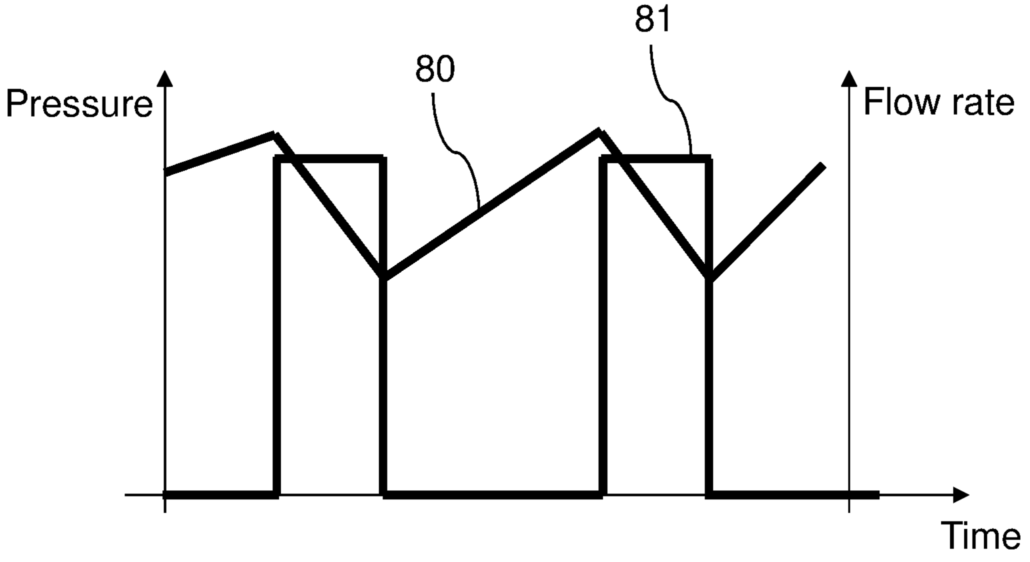
FIG. 6 represents changes in flow rate and pressure during the flow regulation for the backfeeding installation operation.

Two types of regulation envisaged for the compressor are described below. Flow rate regulation means that the flow rate going through the compressor is constant when the unit is in operation. However, it is the suction pressure (for example in a medium pressure network) which triggers the starting and stopping of the compressor when this pressure reaches threshold values set during step 74. FIG. 6 represents an example of the change in the pressure 80 upstream of the compressor and in the flow rate 81 of the compressor, in a case where the pressure threshold value for starting the compressor is 4.2 bar and where the pressure threshold value for stopping the compressor is 2.5 bar. When the pressure decreases between these two threshold values during the operation of the compressor, the automaton regulates the operation of the compressor so as to have a constant flow rate of 700 $Nm^3/h$.

Figure 7:
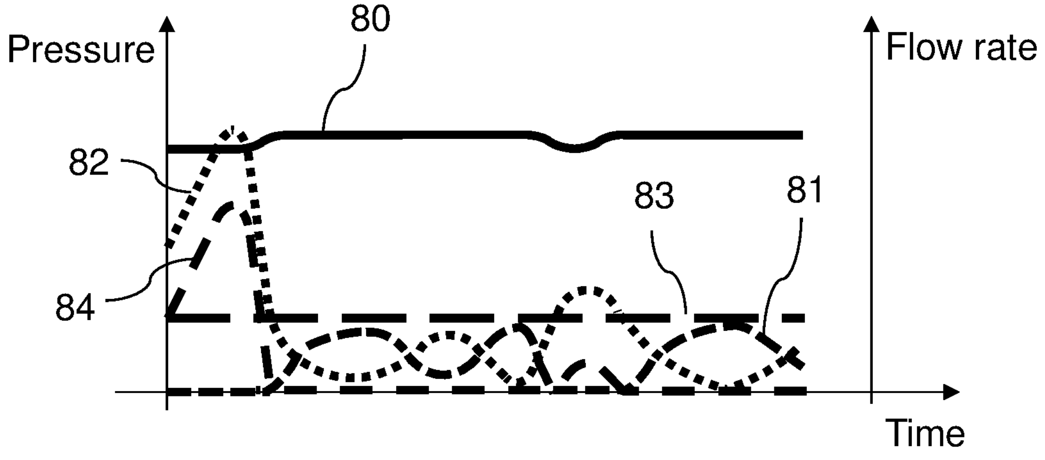
FIG. 7 represents changes in flow rate and pressure during the pressure regulation for the backfeeding installation operation.

In the case of pressure regulation, the flow rate through the unit evolves so that the suction pressure (for example in a medium pressure network) stays constant. FIG. 7 shows an example of the change in the pressure 80 upstream of the compressor and in the flow rate 81 of the compressor with a pressure setpoint value upstream of the compressor of 4 bar, as a function of the flow rate 82 of the gas consumed by the consumers over the distribution network, of the flow rate 83 of the gas injected by biomethane producers over the distribution network. FIG. 7 also shows the flow rate 84 of gas supplied by the transport network.

FIG. 7 shows that, once the flow rate of the consumption over the distribution network is less than the biomethane injection flow rate, the delivery station stops injecting gas from the transport network and the automaton regulates the compressor so that the pressure of the distribution network is constant regardless of variations in consumption over the distribution network.

Where there are two compressors, a first compressor performs the operation of the backfeeding installation through to its operating limit. If necessary, the automaton controls the operation of a second compressor to supplement the flow rate of gas passing through the backfeeding installation.

Both types of regulation have the same objectives, namely to keep conditions stable for as long as possible, and as a result limit the frequent declarations and accelerations of compressors and/or the successive stopping and starting up of compressors, or the delivery station. In current practices, the control mode is selected manually by an operator based on records and his analysis of future events. The algorithmic transcription of the selection for a backfeeding unit is the proportional relationship between the pressure and the flow rate, i.e. the magnitude of a variation in flow rate compared to a variation in suction pressure of the compression unit. When the variation in flow rate affects the variation in pressure too quickly, the control mode is by pressure, especially if there is very little flexibility between the possible maximum and minimum suction pressures of the compression unit.

By means of the present invention, the regulation mode can be selected automatically. In the case where a possible flow rate control is selected, three control areas are defined. Flow rate mode is applied in the central area, and pressure control is applied in the two outer areas. The choice of switching from one mode to the other is based on suction pressure thresholds:

- an upper threshold "SH" for switching from flow rate to pressure (SH adjustable), where SH is close to the maximum possible suction pressure;
- the upper threshold SH less epsilon 1 (E1), where E1 adjustable and SH-E1 is the threshold for returning to flow rate regulation, E1 making it possible to limit changes of mode;
- a lower threshold "SB" for switching from flow rate to pressure (SB adjustable), where SB is close to the minimum possible suction pressure;
- the upper threshold SB less epsilon 2 (E2), where E2 adjustable and SB-E2 is the threshold for returning to flow rate regulation, E2 making it possible to limit changes of mode.

A method of calculating the flow rate from models of the compression elements and its recycling is described below. These methods are current among some suppliers and the invention consists of using its data to assist the main metering and for diagnostics, all automatically, or, if transactional metering is not necessary, to replace the metering of the unit.

All the flow rate calculation methods are based on the upstream pressure (and/or the downstream pressure) and the upstream/downstream pressure differential of the element on which the flow rate will be modeled. The model is derived from the mathematical laws of the industry for the element in question.

For the regulator valve, the flow rate coefficient "Cv", obtained as a function of the percentage of opening and the pressure measurements, makes it possible to recalculate the flow rate passing through the valve.

For a centrifugal compressor, the dimensionless parameters (flow rate and efficiency coefficients and the rotational speed of the compressor or the power consumed by the motorization of the compressor) and the pressure measurements make it possible to recalculate the flow rate passing through a compressor. Another method for a centrifugal compressor is taking the pressure differential in the inlet volute (usual term, "DP-eye" or "eye DP transmitter"), the model generally being provided by the supplier of the compressor.

For a piston compressor, the flow rate is calculated using the dimensional parameters of the piston (compressed volume, dead spaces, rotational speed, and can take into account the control parameter of the flap valves if these are controlled) and the pressure measurements make it possible to recalculate the compressed flow rate.

The flow rates calculated make it possible to determine the flow rate exported by the unit. This flow rate is then:

- compared against the measured flow rate to detect either a problem concerning the transit devices (compressor or regulator valve) or a problem concerning the metering, the comparison generating a remotely-transmitted alarm for a remote diagnosis; and
- used automatically as a replacement for the measured flow rate if that is deficient.

The present invention also provides:

- a means for determining the flow rate through the backfeeding unit making it possible to eliminate the metering of the unit at the installation;
- if the backfeeding installation is equipped with a device for measuring the flow rate passing through it, a means for determining the flow rate through the backfeeding installation making it possible to automatically substitute for the metering of the installation if this metering is deficient, and making it possible to detect a malfunction of the compressor or of the recycling valve (if installed);
- a means for determining the optimum control mode of the compression unit, between pressure or flow rate;
- an analysis system allowing operators, remote or not, to do without an intervention or to evaluate the maximum length of time before an intervention.

Everything that has been described above with regard to predicting the pressure is also valid for predicting the gas quality. In some embodiments, the backfeeding installation therefore comprises:

- a means for analyzing the quality of the gas to be compressed;
- a remote communication means for receiving at least one instantaneous gas quality value captured remotely upstream or downstream of the backfeeding installation;

a means for predicting the change in gas quality in the network upstream of the backfeeding installation, as a function, at least, of the quality values received;

a means for determining a gas quality threshold value for stopping at least one compressor as a function of the predicted quality change.

The automaton controls the operation of at least one compressor to stop when the quality at the inlet of each compressor is lower than the quality threshold value that was determined.

In some embodiments, the backfeeding installation also comprises a means for determining a loading rate of each compressor as a function of the predicted quality change, the automaton controlling the operation of each compressor to achieve the loading rate that was determined.

The threshold value determination means preferably comprises a means for determining the absorption capacity of a non-compliant gas (low quality) downstream of the backfeeding installation, a capacity making it possible to dispense with a treatment or to exceed the treatment capacities of the existing installations.

More details are given below concerning the prediction means, also called the predictive system.

Note that the purpose of a predictive system is the statistical prediction of a future state of a system. Such a system is based on the statistical association of past values of input parameters, called “predictors”, to at least one past output state.

In a predictive learning system, the impact of the predictors on the output state is initially unknown and is the subject of a learning process. The learning process consists of assigning a statistical weight to each type of predictor as a function of the relevance of the past values of the predictor in estimating the known past state of the system.

Such an approach therefore consists of presupposing that the relative impact of all the predictors is unknown or can be modified during the learning process. Therefore, a set of coefficients can change over time as new predictors and state values are recorded in the database on which the learning algorithm is based.

The predictions utilized are based on a dynamic learning process and predictors such as profiles of consumers, suppliers, capacities and response times of the backfeeding installation compressors, inertia and safety. The dynamic learning process, based on algorithms of automatic learning, artificial intelligence and/or neural networks, means that the predictive system uses historic data, in particular, for a large number of predictors such as dates and times, pressures observed at different points in the distribution network and the starting and stopping of the safety, expansion, backfeeding, consumption, injection functions. In some variants, these data are supplemented by meteorological data. The predictive system continues to collect these data when this predictive system is then used for starting the operation of and stopping the backfeeding installation and its devices such as valves.

During the initialization of the predictive system it is, for example, provided with the following, for each gas consumer and each gas supplier present in the distribution network:

the gas consumption or injection profile;

the distance, up to the backfeeding installation; and the volume of gas or the average cross-section area of the line, up to the backfeeding installation.

In addition, the predictive model is provided, for example, with the topology of the distribution network, with its branch lines and the positions of the sensors. The predictive model is also provided with ramp-up curves for the expansion station and backfeeding installation, for example. Lastly, the predictive model is, for example, provided with the initial pressure setpoint limits and permanent pressure safety limits for each branch of the distribution network.

During the operation of the predictive system, it receives all the pressure, flow rate and gas analysis (according to needs, one or more constituents of the molar composition or total sulfur, water content, etc.) values captured on the distribution network, upstream and downstream of the expansion station and the backfeeding installation.

Based on this, as well as on the calendar data (days of the week, day and month, public holidays) and times, the meteorological data and, possibly, agricultural patterns making it possible to anticipate consumptions or injections of gas, the predictive system predicts the pressure change upstream or downstream of a pressure installation and therefore, as a function of a pressure safety value not to be exceeded, the need to start or stop the backfeeding installation or, on the other hand, the expansion station of the transport network.

The predictive system makes it possible to regulate the operation of the backfeeding installation and expansion stations to avoid having to stop the backfeeding unit or the biomethane producer for which the quality of the gas does not allow it to be conveyed downstream of the backfeeding unit.

In this way, the predictive system characterizes time constants and safety constants, and predicts pressure values and/or pressure setpoint values, for different operating modes (injection, consumption, backfeeding and/or expansion, simultaneous or not) and different times (of the year, of the week and/or of the day).

For example, on a weak link of the distribution network (i.e. having low inertia or a low volume in relation to the nominal or maximum consumption), a preventive emergency stop signal is provided for the backfeeding installation once the prediction foresees a pressure drop below the minimum setpoint value.

In addition, the predictive system determines preferential times for maintenance or inspection stops, on the same basis. These preferential times are those which minimize a cost function of these stops.

Note that the predictive system can, depending on the embodiments, perform two types of prediction:

predicting the gas quality or pressure, in a timeframe of a couple of minutes or several hours; and/or predicting maximum and minimum pressure setpoint values to be applied, such values being determined as a function of a predicted pressure change.

In the first case, the setpoint and safety values are maintained, but the gas quality or pressure prediction is used to determine whether a setpoint value would be exceeded without modification to the operating conditions of the expansion station and backfeeding installation and, if yes, whether this would be temporary. If it is not going to be temporary, the operating conditions of the expansion station and backfeeding installation are modified. Similarly, the gas quality or pressure prediction is used to determine whether a safety value would be exceeded without modification to the operating conditions of the expansion station and backfeeding installation; if yes, the operating conditions of the expansion station and backfeeding installation are modified.

In the second case, the predicted setpoint values are utilized for the automatic operation of the expansion station and backfeeding installation devices. For example, once the pressure of the distribution network, at the location of the expansion station and backfeeding installation, drops below the predicted minimum setpoint value, the expansion station is put into operation. In contrast, once the pressure of the distribution network, at the location of the expansion station and backfeeding installation, exceeds the predicted maximum setpoint value, the backfeeding installation is put into operation.

The setpoint and safety value expressions can be uniform over the distribution network or, in contrary, vary according to the sections and branches of the network, these sections and branches being equipped with at least one pressure and/or flow rate sensor.

The means 7 for determining pressure threshold values ("setpoints") for starting or stopping at least one backfeeding compressor, possibly incorporated into the predictive system, as described above (second case), optimizes an energy and/or economic cost factor, based on the cost or benefit linked to the following events:

safety shutdown;
maintenance, repair or inspection operations;
starting the backfeeding installation; and
on the benefit side, delivery and consumption.

To this end, the means 7 for determining pressure setpoint threshold values comprises a calculator of energy and/or economic benefits and costs.

The invention claimed is:

1. Backfeeding installation comprising:

at least one compressor for compressing gas from a network;
an automaton for controlling the operation of at least one compressor;
a remote communication means for receiving at least one instantaneous pressure value captured remotely upstream or downstream of the backfeeding installation;
a means for predicting the change in pressure in the network upstream of the backfeeding installation, as a function, at least, of the pressure values received;
a means for determining a pressure threshold value for stopping and/or a pressure threshold value for starting at least one compressor as a function of the predicted pressure change, the automaton controlling the stopping or operation of at least one compressor when the pressure at the inlet of each compressor is respectively lower, or higher, than the pressure threshold value that was determined, and wherein the prediction means uses historic data of pressures observed at different points in the distribution network and of the starting and stoppinq of safety, expansion, backfeeding, consumption, injection functions.

2. Installation according to claim 1, wherein the prediction means utilizes a dynamic learning process and profiles of consumers, suppliers and capacities, and response times for the backfeeding installation.

3. Installation according to claim 1, wherein the prediction means utilizes artificial intelligence algorithms and/or neural networks.

4. Installation according to claim 1, wherein the prediction means uses meteorological data.

5. Installation according to claim 1, wherein the prediction means uses the following for each gas consumer and each gas supplier present in the distribution network:

the gas consumption or injection profile;
the distance up to the backfeeding installation;
the volume of gas or the average cross-section area of the line, up to the backfeeding installation.

6. Installation according to claim 1, wherein the prediction means uses the topology of the distribution network, with its branch lines and the positions of the sensors.

7. Installation according to claim 1, wherein the prediction means uses ramp-up curves for the expansion station and backfeeding installation.

8. Installation according to claim 1, wherein the prediction means is configured to determine preferential times for maintenance or inspection stops, minimizing a cost function of these stops.

9. Installation according to claim 1, wherein the prediction means is configured to predict pressures, in a timeframe of a couple of minutes or several hours.

10. Installation according to claim 1, wherein the prediction means is configured to predict maximum and minimum pressure setpoint values.

11. Installation according to claim 1, which also comprises a means for determining a loading rate to be applied to each compressor as a function of the predicted pressure change, the automaton controlling the operation of each compressor to achieve the loading rate that was determined.

12. Installation according to claim 1, which also comprises a means for analyzing the quality of the gas to be compressed;
a remote communication means configured for receiving at least one instantaneous gas quality value captured remotely upstream or downstream of the backfeeding installation;
a means for predicting the change in gas quality in the network upstream of the backfeeding installation, as a function, at least, of the quality values received;
a means for determining a gas quality threshold value for stopping at least one compressor as a function of the predicted quality change, the automaton controlling the stopping of at least one compressor when the quality at the inlet of each compressor is lower than the quality threshold value that was determined.

13. Installation according to claim 12, which also comprises a means for determining a loading rate to be applied to each compressor as a function of the predicted quality change, the automaton controlling the operation of each compressor to achieve the loading rate that was determined.

14. Installation according to claim 1, which also comprises a means for automatically selecting flow rate or pressure regulation mode.

15. Installation according to claim 14, wherein, between two threshold values (S.H., S.B.), the regulation mode is a flow rate regulation and, outside the bounds of these two threshold values, the regulation mode is pressure regulation.

16. Method for operating a backfeeding installation comprising:

at least one compressor for compressing gas from a network;
an automaton for controlling the operation of at least one compressor, which method comprises the following steps:

a step of receiving, from a remote sensor, at least one instantaneous pressure value captured remotely from the backfeeding installation;
a step of predicting the change in pressure in the network upstream of the backfeeding installation;
a step of determining a pressure threshold value for stopping or starting at least one compressor as a function of the predicted pressure change;

a step of respectively stopping or starting the operation of at least one compressor when the pressure at the inlet of each compressor is respectively lower, or higher, than the pressure threshold value that was determined, wherein the step of predicting uses historic data of pressures observed at different points in the distribution network and of the starting and stoppinq of safety, expansion, backfeeding, consumption, injection functions.

17. Method according to claim 16, which also comprises:

a step of determining loading rates for the compression unit to be applied as a function of the predicted pressure change;

a step of regulating the operation of each compressor to achieve the loading rate to be applied.

18. Method according to claim 16, which also comprises:

a step of receiving, from a remote sensor, at least one instantaneous gas quality value captured remotely from the backfeeding installation;

a step of predicting the change in gas quality upstream of the backfeeding installation;

a step of determining a gas quality threshold value for stopping each compressor as a function of the predicted quality change;

a step of stopping the operation of each compressor when the gas quality at the inlet of each compressor is lower than the quality threshold value that was determined.

19. Method according to claim 18, which also comprises:

a step of determining loading rates for the compression unit to be applied as a function of the predicted gas quality change; and a step of regulating the operation of each compressor to achieve the loading rate to be applied.

* * * * *